United States Patent [19]

Förster et al.

[11] Patent Number: 4,900,084
[45] Date of Patent: Feb. 13, 1990

[54] MOTOR VEHICLE SEAT

[75] Inventors: Alfred Förster, Weinstadt; Johann Kotzab, Notzingen; Willi Geyer, Oberboihingen, all of Fed. Rep. of Germany

[73] Assignee: Daimler-Benz AG, Stuttgart, Fed. Rep. of Germany

[21] Appl. No.: 234,086

[22] Filed: Aug. 19, 1988

[30] Foreign Application Priority Data

Aug. 19, 1987 [DE] Fed. Rep. of Germany ....... 3727671

[51] Int. Cl.$^4$ ............................ A47C 7/02; B60N 1/00
[52] U.S. Cl. .................................. 297/216; 297/445; 297/DIG. 2
[58] Field of Search ................ 297/216, 445, DIG. 1, 297/DIG. 2

[56] References Cited

U.S. PATENT DOCUMENTS

| | | |
|---|---|---|
| 2,952,304 | 9/1960 | Pinkel . |
| 3,531,154 | 9/1970 | Fleche ................................. 297/216 |
| 3,582,133 | 6/1971 | Delavene ....................... 297/216 X |
| 3,984,128 | 10/1976 | Oehm et al. . |
| 4,154,472 | 5/1979 | Bryll ................................ 297/216 X |
| 4,225,178 | 9/1980 | Takada ................................ 297/216 |
| 4,657,121 | 4/1987 | Uchida et al. . |

FOREIGN PATENT DOCUMENTS

| | | |
|---|---|---|
| 0009654 | 9/1979 | European Pat. Off. . |
| 2312209 | 9/1974 | Fed. Rep. of Germany . |
| 1963335 | 6/1978 | Fed. Rep. of Germany . |
| 2844628 | 4/1980 | Fed. Rep. of Germany ...... 297/216 |
| 2913474 | 10/1980 | Fed. Rep. of Germany ...... 297/216 |
| 3301708 | 8/1984 | Fed. Rep. of Germany . |
| 2184325 | 12/1973 | France . |

OTHER PUBLICATIONS

372 Automotive Engineering, vol. 89, No. 12/91, Dallas, Tx, U.S.A.

Primary Examiner—Peter R. Brown
Attorney, Agent, or Firm—Barnes & Thornburg

[57] ABSTRACT

A motor vehicle seat is disclosed which can pivot with respect to its underframe in a predetermined direction about a rear axis a transverse direction extending perpendicularly to the travel direction of the vehicle. The seat is supported on the underframe by means of a front deformation element arranged at a distance from the rear axis. The deformation element serves to lessen the severity of injury to person colliding with the seat backrest from behind. The deformation element is designed as a foamed material block surrounded by a shell. The upper and lower shell surfaces of the shell are respectively provided with fastening devices for fixing to the underside of the seat and to the underframe. The shell has predetermined bending sections which form the folding lines during pivoting of the motor vehicle seat caused by an accident.

13 Claims, 1 Drawing Sheet

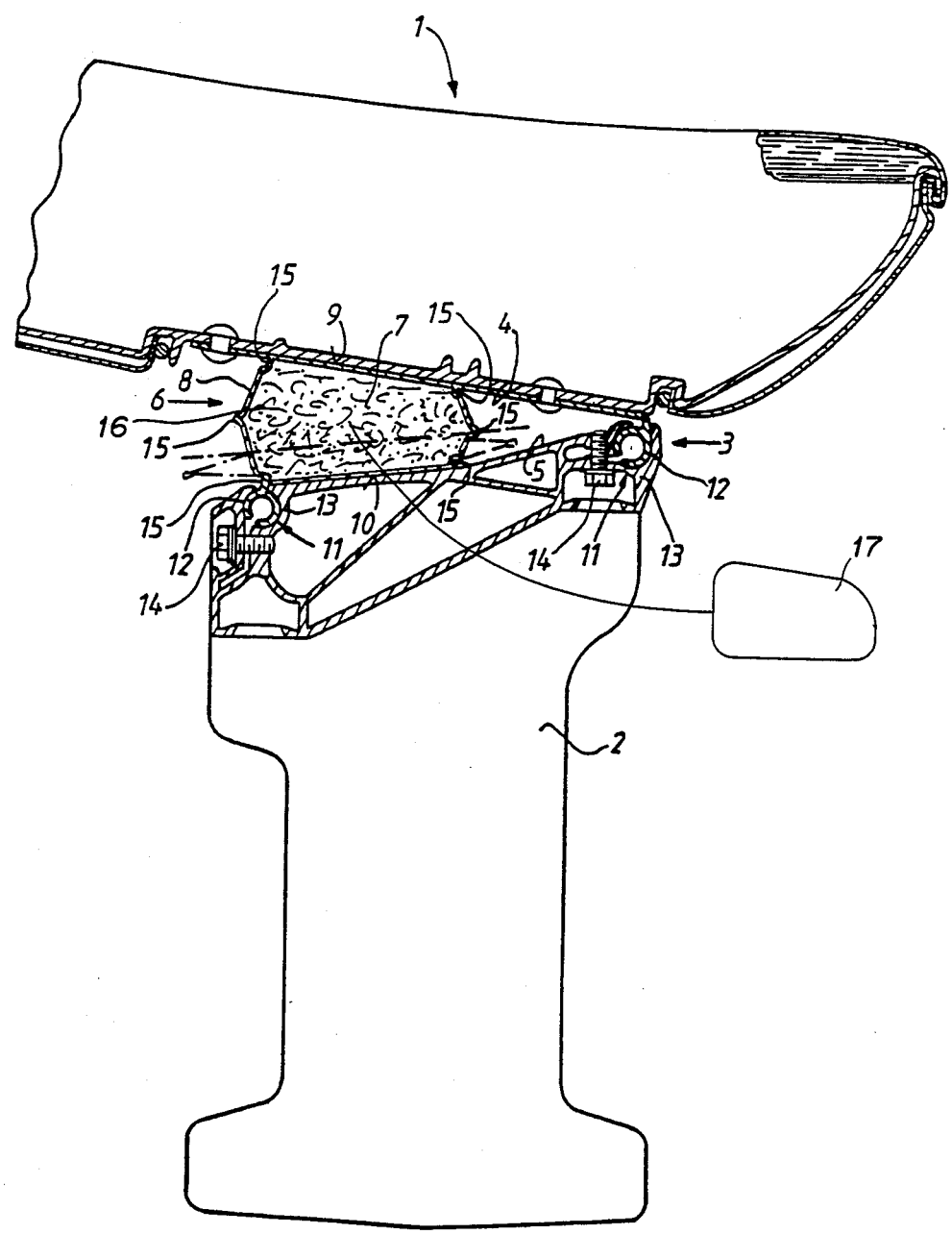

4,900,084

MOTOR VEHICLE SEAT

BACKGROUND AND SUMMARY OF THE INVENTION

The invention relates to a motor vehicle seat which can pivot with respect to its underframe in a predetermined rear axis extending in the transverse direction of the vehicle. The seat is supported on the underframe by means of a front deformation element arranged at a distance from the rear axis, the deformation element only permitting pivoting when a given load is exerted as the result of an accident.

Such a motor vehicle seat is known from German Published Unexamined Pat. Application (DOS) 1,963,335, in which the deformation element is designed as a stretched member wound on a block, the windings of which member are pulled apart with energy absorption when the seat pivots back as the result of an accident.

An object of the invention is to create a deformation element which can easily be adapted to different requirements, is simple to fit and at the same time inexpensive and capable of reducing the affect of the forces introduced from the rear into the backrest by a passenger colliding into it by a deliberate tilting movement of the seat with energy absorption, lessening injury.

This object is achieved by designing the deformation element as an energy absorbing foamed material block surrounded by a shell fastened by fastening devices to the underframe and the underside of the seat, which shell is constructed with predetermined weakened bending points or areas which form folding lines during pivoting of the seat caused by an accident.

Cost advantages are obtained and difficult cross-sectional shapes optimally utilizing the existing space are achieved in certain preferred embodiment wherein the shell consists of an extruded section.

The lateral displacement capability required in particular on an omnibus seat on the central aisle side can be achieved in a simple way in especially preferred embodiments by providing transverse guide tracks molded onto the extruded section at the ends so as protrude on the upper side and lower side to be held adjustable with sliding movement by assigned receptacles of the underframe. It is advantageous in this case if the upper transverse guide track and its receptacle on the underframe side also form the pivoting device for the seat.

An ingress of moisture can be prevented if the shell is completed to form a fully enclosed container by easily deformable, preferably clipped-on wall parts at the ends, in accordance with especially preferred embodiments.

Other objects, advantages and novel features of the present invention will become apparent from the following detailed description of the invention when considered in conjunction with the accompanying drawing.

BRIEF DESCRIPTION OF THE DRAWING

The single drawing FIGURE is a schematic partial, part-sectional, view of a vehicle seat constructed in accordance with a preferred embodiment of the invention.

DETAILED DESCRIPTION OF THE DRAWING

A motor vehicle seat (1), not shown in more detail, having a seat cushion and a backrest, rests on an underframe 2. The entire motor vehicle seat 1 can be pivoted forwards by means of a pivoting device 3 located at the rear in the vehicle normal forward traveling direction, in the event of a passenger sitting behind the backrest colliding with it as the result of an accident. The collision energy is reduced to lessen passenger injuries by a plastic deformation of a deformation element 6 arranged between the underside 4 of the seat and the upper side 5 of the underframe 2. In this pivoting movement, the upper edge of the backrest moves upwards, so that even quite tall passengers can be safely cushioned.

The deformation element 6 comprises a foamed material block 7, which can be compressed with energy absorption and which is surrounded by a shell 8 which preferably forms a portion of an extruded section and transfers the forces between the seat 1 and underframe 2 occurring during normal traveling. The upper shell surface 9 and the lower shell surface 10 are provided with molded-on fastening means 11, of which some are designed as transverse guide tracks 12 and are guided transversely displaceably by receptacles 13 of the underframe 2. Screws 14 serve to adjust the transverse displacement force. In a double-seat arrangement in an omnibus, the seat on the window side is generally fixed while the seat on the aisle side is held displaceably by a device which is not shown to increase the seat distance with respect to the central aisle.

On the shell 8 of the deformation element 6 there are formed predetermined bending points or areas 15, which form folding lines during compression of the deformation element 6 as the result of an accident. In preferred embodiments, these bending areas are configured so that the folding lines extend transversely of the vehicle travel direction. The proportion of energy absorbed by the shell 8 is relatively small. When the deformation capacity has been completely utilized, the deformation element 6 assumes the folded-outwards position represented by dot-dashed lines.

In order that the foamed material block 7 is protected against the absorption of moisture, the shell surfaces at the lateral ends 16 are closed by easily deformable covers 17, so that a container enclosed from the outside on all sides is obtained., However, embodiments are also completed using a suitable lacquering to seal the foamed material block against moisture absorption.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Motor vehicle seat having a seat backrest, comprising a pivoting support device for accommodating forward pivotal movement of the seat with respect to a support base about a rear axis running in transverse direction of a vehicle, and a front deformation element arranged at a distance from the rear axis, and supporting the seat on the support base, the deformation element being configured to only permit forward pivoting of the seat when a given load is exerted as the result of an accident, wherein the deformation element is designed as an energy-absorbing foamed material block at least partially surrounded by a shell having a forward facing end and a rearward facing end, wherein a seat facing surface and a support base facing surface of the shell are provided with fastening means for fixing to a rear and front end of the support base, respectively, and wherein the shell has predetermined bending points which form folding lines at the forward facing end and the rearward facing end of the shell during compression of the deformation element resulting from pivoting of the motor vehicle seat caused by an accident, each folding line extending substantially parallel to the rear axis, whereby the deformation element is deformed at least when a passenger sitting in an adjacent seat at the rear of the seat impacts the seat backrest as a result of the accident.

2. Motor vehicle seat according to claim 1, wherein the shell comprises an extruded material.

3. Motor vehicle seat according to claim 2, wherein the fastening means comprises downwardly depending transverse guide tracks which are molded onto the extruded material of the shell and protrude from a rearward end of the seat facing surface and a forward end of the support base facing surface of the shell, said guide tracks being held adjustably with sliding movement by assigned receptacles of the support base.

4. Motor vehicle seat according to claim 3, wherein the downwardly depending transverse guide track of the upper surface of the shell engages its assigned receptacle on the support base to form the pivot support device for the motor vehicle seat.

5. Motor vehicle seat according to claim 4, wherein the shell is completed to form a fully enclosed container by easily deformable, wall parts at lateral ends of the shell.

6. Motor vehicle seat according to claim 3, wherein the shell is completed to form a fully enclosed container by easily deformable, wall parts at lateral ends of the shell.

7. Motor vehicle seat according to claim 2, wherein the shell is completed to form a fully enclosed container by easily deformable, wall parts at lateral ends of the shell.

8. Motor vehicle seat according to claim 1, wherein the shell is completed to form a fully enclosed container by easily deformable, wall parts at lateral ends of the shell.

9. Motor vehicle seat according to claim 5, wherein said seat is a bus seat located in a row on a bus such that the seat backrest is imparted by a passenger sitting in the next adjacent seat at the rear of the seat.

10. Motor vehicle seat according to claim 9, wherein said predetermined bending points are configured such that said folding lines extend transversely of the vehicle travel direction.

11. Motor vehicle seat according to claim 1, wherein said seat is a bus seat located in a row on a bus such that the seat backrest is impacted by a passenger sitting in the next adjacent seat at the rear of the seat.

12. Motor vehicle seat according to claim 11, wherein said predetermined bending points are configured such that said folding lines extend transversely of the vehicle travel direction.

13. Motor vehicle seat according to claim 1, wherein said predetermined bending points are configured such that said folding lines extend transversely of the vehicle travel direction.

* * * * *